(12) United States Patent
Tucker et al.

(10) Patent No.: US 6,437,781 B1
(45) Date of Patent: *Aug. 20, 2002

(54) COMPUTER GRAPHICS SYSTEM HAVING PER PIXEL FOG BLENDING

(75) Inventors: S. Paul Tucker; Bradly J. Foster; Steven J. Kommrusch, all of Ft. Collins, CO (US)

(73) Assignee: Hewlett-Packard Company, Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/866,556

(22) Filed: May 30, 1997

(51) Int. Cl.[7] .............................................. G06T 15/50
(52) U.S. Cl. ...................................................... 345/426
(58) Field of Search ............................... 345/426, 419, 345/581, 582, 593, 589

(56) References Cited

U.S. PATENT DOCUMENTS 5,724,561 A * 3/1998 Tarolli et al. ............... 345/523
5,926,406 A * 7/1999 Tucker et al. ............... 364/753
6,008,815 A * 12/1999 Levison ...................... 345/428

OTHER PUBLICATIONS

Knittel, "A Fast Logarithm Converter", ASIC Conference and Exhibit, 1994. Proceedings., Seventh Annual IEEE International.*

* cited by examiner

Primary Examiner—William A. Cuchlinski, Jr.
Assistant Examiner—Thu Nguyen (57) ABSTRACT

A computer graphics system includes an apparatus for fog blending colors to be displayed on a graphics display of the computer graphics system. The computer graphics system includes a rendering parameter calculation unit responsive to data of a primitive, that determines a cooked exponent value and a color value for at least one pixel of the primitive. In addition, the system includes a fog unit responsive to the cooked exponent value for each pixel of the primitive, that determines a fog blending factor for each pixel of the primitive, wherein the fog blending factor is one of an exponential fog blending factor and an exponential-squared fog blending factor. Further, the system includes a fog blending unit responsive to the color value and the fog blending factor for each pixel of the primitive and also to a fog color value, that blends the fog color value with the color value for each pixel of the primitive according to the fog blending factor for the respective pixel, and that provides a fogged color value for each pixel of the primitive. In addition, the computer graphics system may include a first interpolator, responsive to the color value and the cooked exponent value for at least one pixel of the primitive, that determines the color value and the cooked exponent value along an edge of the primitive so as to provide the cooked exponent value and the color value for each pixel of the edge of the primitive. Further, the computer graphics system may also include a second interpolator, responsive to the cooked exponent value and the color value for each pixel of the edge of the primitive, that determines the cooked exponent value and the color value along a span of the primitive so as to provide the cooked exponent value and the color value for each pixel of the span of the primitive. In this way, the system provides fast and accurate exponential and exponential-squared fog blending of the color values of the primitive without a lot of hardware.

22 Claims, 6 Drawing Sheets

COMPUTER GRAPHICS SYSTEM HAVING PER PIXEL FOG BLENDING

FIELD OF THE INVENTION

This invention relates to color rendering in computer graphics systems and, more particularly, to methods and apparatus for performing fog blending on a per pixel basis.

BACKGROUND OF THE INVENTION

Computer graphics systems commonly are used for displaying graphical representations of objects on a two dimensional display screen. Current computer graphics systems can provide highly detailed representations and are used in a variety of applications.

In typical computer graphics systems, an object to be represented on a display screen is broken down into a plurality of graphics primitives. Primitives are basic components of a graphics picture such as points, lines, vectors and polygons (i.e., triangles). Typically, a hardware/software scheme is implemented to render (draw) on a two-dimensional display screen, the graphics primitives that comprise a view of one or more objects.

A host computer commonly provides primitive data that represents the primitives of a three-dimensional object to be rendered. When the primitive is a triangle, for example, the host computer may define the triangle in terms of the X, Y, Z coordinates of its vertices, as well as the red, green, blue (R, G, B) color values of each vertex. Rendering hardware interpolates the primitive data to compute the display screen pixels that comprise each primitive, and the R, G, B color values for each pixel.

The basic components of a typical computer graphics system include a geometry accelerator, a rasterizer and a frame buffer. The system also may include other hardware such as texture mapping hardware (described below). The geometry accelerator receives, from the host computer, vertex coordinate and color data for primitives that comprise an object. The geometry accelerator typically performs transformations on the vertex coordinate data (i.e., to screen space coordinates), decomposes quadrilaterals into triangles, and may perform other functions such as lighting, clipping and producing plane equation calculations for each primitive. The output from the geometry accelerator, referred to as rendering data, is used by the rasterizer (and optional texture mapping hardware) to compute final screen space coordinates and R, G, B color values for each pixel comprising the primitives. The final data is stored in the frame buffer for display on a display screen. Some graphics systems are pipelined such that various operations (such as transformations, interpolation, etc.) are performed simultaneously by different components on different object primitives.

More sophisticated systems offer texture mapping as an option so that objects can be displayed with improved surface detail. Texture mapping is a method that involves mapping a source image, referred to as a texture, onto a surface of a three-dimensional object, and thereafter mapping the textured three-dimensional object to the two-dimensional graphics display screen to display the resulting image. Texture mapping involves applying one or more texture elements (texels) of a texture to each picture element (pixel) of the displayed portion of the object to which the texture is being mapped. Texture mapping hardware subsystems typically include a local memory that stores texture data associated with the object being rendered.

Depth cueing is another technique for producing a more realistic display. In depth cueing, an object's color is gradually blended into the background color (also known as the depth cue color), based on the distance from the viewer to the object. This distance is usually approximated by the depth, or Z value, of the object. Depth cueing may be used for simulating the atmospheric attenuation of light intensity. Thus, as objects get farther from the viewer, they appear dimmer. Any color can be used as the depth cue color, but black is used most often.

Fog blending is still another technique for producing a more realistic display. In fog blending, an object's color is gradually blended into an arbitrary color (the fog color), using a fog blending factor f, which is primarily based on the distance from the eye point of the viewer of the object. This distance is usually approximated by the distance, or Z value, of the object between the eye and the object in eye coordinates, wherein the eye coordinates are defined as being negative when Z is in front of the eye.

It is a general object of the present invention to provide an improved fog blending for color rendering in a computer graphics system.

SUMMARY OF THE INVENTION

It is an object of the present invention to provide fast and accurate exponential and exponential squared fog blending.

This and other objects are obtained generally by providing a computer graphics system having an apparatus for fog blending colors. The apparatus includes a rendering parameter calculation unit that in response to data of a primitive that is to be displayed, determines a cooked exponent value and a color value for at least one pixel of the primitive. In addition, the apparatus includes a fog unit responsive to the cooked exponent value for each pixel of the primitive, that determines a fog blending factor for each pixel of the primitive, wherein the fog blending factor is one of an exponential fog blending factor and an exponential-squared fog blending factor. Further, the apparatus includes a fog blending unit responsive to the color value and the fog blending factor for each pixel of the primitive and also responsive to a fog color value, that blends the fog color value with the color value for each pixel of the primitive according to the fog blending factor for each pixel of the primitive and that outputs a fogged color value for each pixel of the primitive.

In one embodiment of the computer graphics system, the apparatus includes a first interpolator, responsive to the cooked exponent value and the color value for at least one pixel of the primitive, that determines the cooked exponent value and the color value along an edge of the primitive and that provides, at an output, the cooked exponent value and the color value for each pixel of the edge of the primitive.

In another embodiment of the computer graphics system, the apparatus includes a second interpolator, responsive to the cooked exponent value and the color value for each pixel of the edge of the primitive, that determines the cooked exponent value and the color value along a span of the primitive and that provides, at an output, the cooked exponent value and the color value for each pixel of the span of the primitive.

In a further embodiment of the computer graphics system, the fog unit includes a lookup table having a first column of entries that correspond to a first part of a $2^{-fraction}$ portion of the fog blending factor for a plurality of possible bits of the cooked exponent value, and a second column of entries that correspond to a delta between two consecutive entries in the first column of entries. The fog unit also includes a multiplier that is responsive to the delta value provided by the lookup table and to additional bits of the cooked exponent value, that multiplies the delta value with the additional bits of cooked exponent value and that provides an interpolated value of a second part of the $2^{-fraction}$ portion of the fog blending factor at an output of the multiplier. The fog unit further includes a subtractor that is responsive to the interpolated value of the second part of the $2^{-fraction}$ portion of the fog blending factor and to one of the entries of the first column of entries of the lookup table that subtracts the interpolated value of the second part of the $2^{-fraction}$ portion of the fog blending factor from the first part of the $2^{-fraction}$ portion of the fog blending factor to provide at an output a value of the $2^{-fraction}$ portion of the fog blending factor. Still further, the fog unit comprises a barrel shifter that shifts to the right the value of the $2^{-fraction}$ portion of the fog blending factor by an integer value so as to provide multiplication of the $2^{-fraction}$ portion of the fog blending factor with a $2^{-fraction}$ portion of the fog blending factor, and that provides at an output the fog blending factor.

In accordance with another aspect of the present invention, in a computer graphics system comprising a geometry accelerator and a rasterizer that together generate a graphics image on a video display screen, a method for fog blending colors in the graphics system is provided. The method comprises the steps of determining a cooked exponent value and a color value for at least one pixel of a primitive to be displayed on the video display screen in response to data of the primitive. In addition, the method comprises determining a fog blending factor for each pixel of the primitive in response to the cooked exponent value for each pixel of the primitive, wherein the fog blending factor is one of an exponential fog blending factor and an exponential-squared fog blending factor. Still further, the color value for each pixel of the primitive is blended with a fog color value according to the fog blending factor for each pixel of the primitive so as to provide a fogged color value for each pixel of the primitive.

In one embodiment of the method of the present invention, the method further comprises the step of interpolating the color value and the cooked exponent value along an edge of the primitive in response to the color value and the cooked exponent value for at least one pixel of the primitive, to provide the color value and the cooked exponent value for each pixel of the edge of the primitive.

In another embodiment of the method of the present invention, the method further comprises the step of interpolating the cooked exponent value and the color value along a span of the primitive, in response to the cooked exponent value and the color value for each pixel of the edge of the primitive, to provide the cooked exponent value and the color value for each pixel of the span of the primitive.

In a further embodiment of the method of the present invention, the step of determining the fog blending factor includes determining, with a lookup table, a first part of a $2^{-fraction}$ portion of the fog blending factor. In addition, the step of determining the fog blending factor further includes linearly interpolating a second part of the $2^{-fraction}$ portion of the fog blending factor. Further, the step of determining the fog blending factor includes subtracting the second part of the $2^{-fraction}$ portion of the fog blending factor from the first part of the $2^{-fraction}$ portion of the fog blending factor to determine the $2^{-fraction}$ portion of the fog blending factor. Still further, the step of determining the fog blending factor includes multiplying the $2^{-fraction}$ portion of the fog blending factor with a $2^{-fraction}$ portion of the fog blending factor by shifting, to the right, the $2^{-fraction}$ portion of the fog blending factor by the integer value.

The features and advantages of the present invention will be more readily understood and apparent from the following detailed description of the invention, which should be read in conjunction with the accompanying drawings and from the claims which are appended to the end of the detailed description.

BRIEF DESCRIPTION OF THE DRAWING

For a better understanding of the present invention, reference is made to the accompanying drawings, which are incorporated herein by reference and in which.

DETAILED DESCRIPTION

Figure 1:
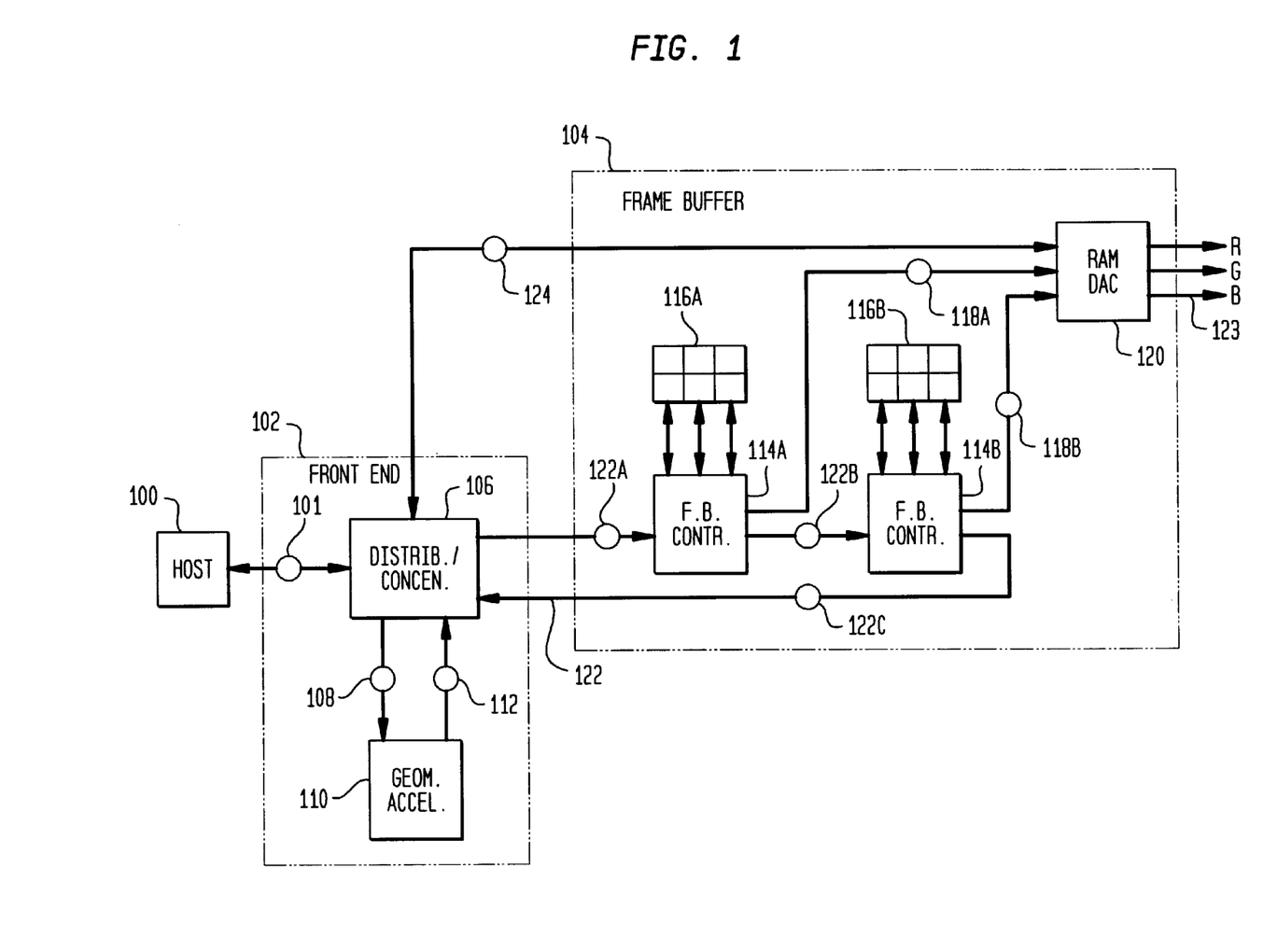
FIG. 1 is a block diagram of a first embodiment of a computer graphics system incorporating the present invention.
Figure 2:
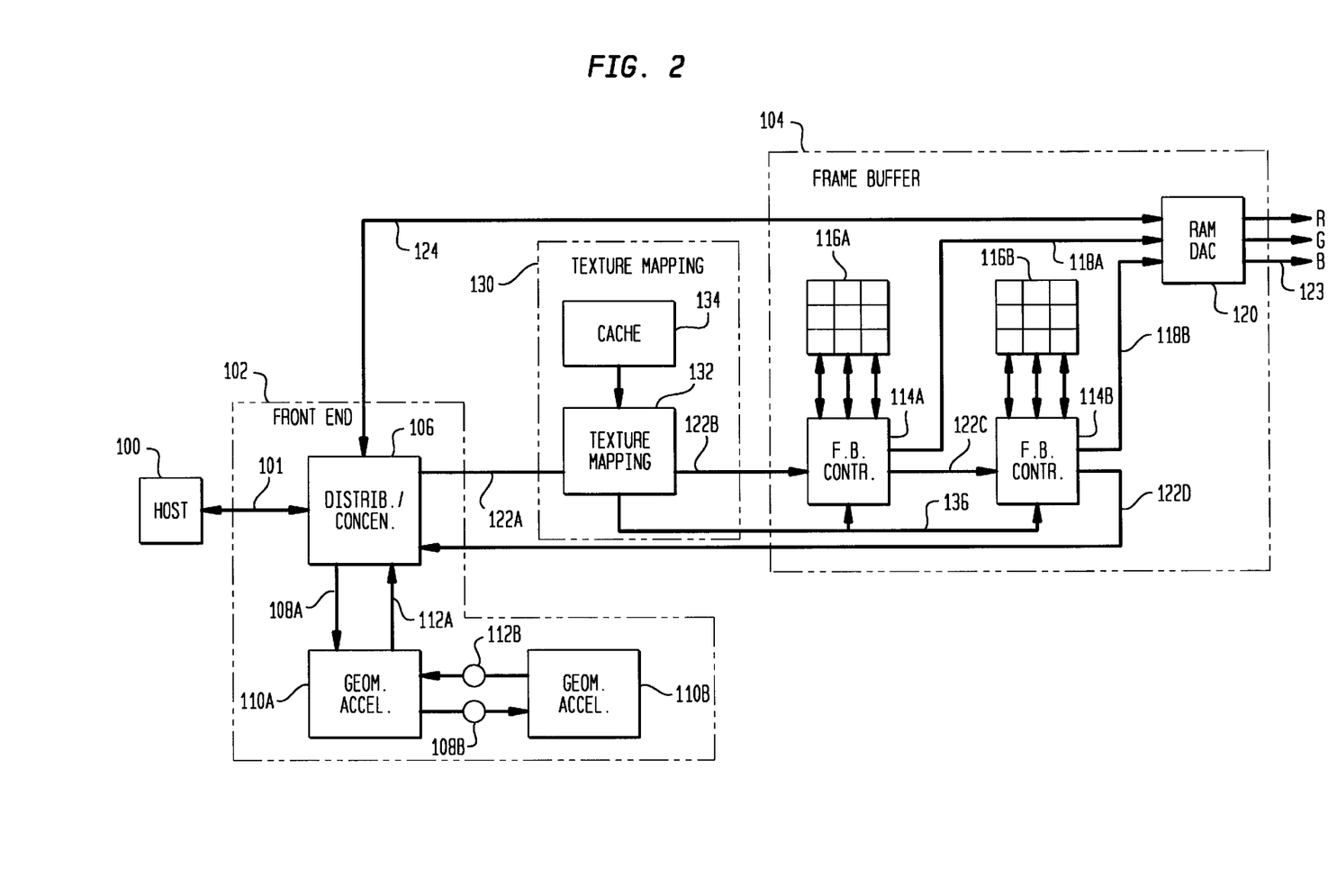
FIG. 2 is a block diagram of a second embodiment of a computer graphics system incorporating the present invention.
Figure 3:
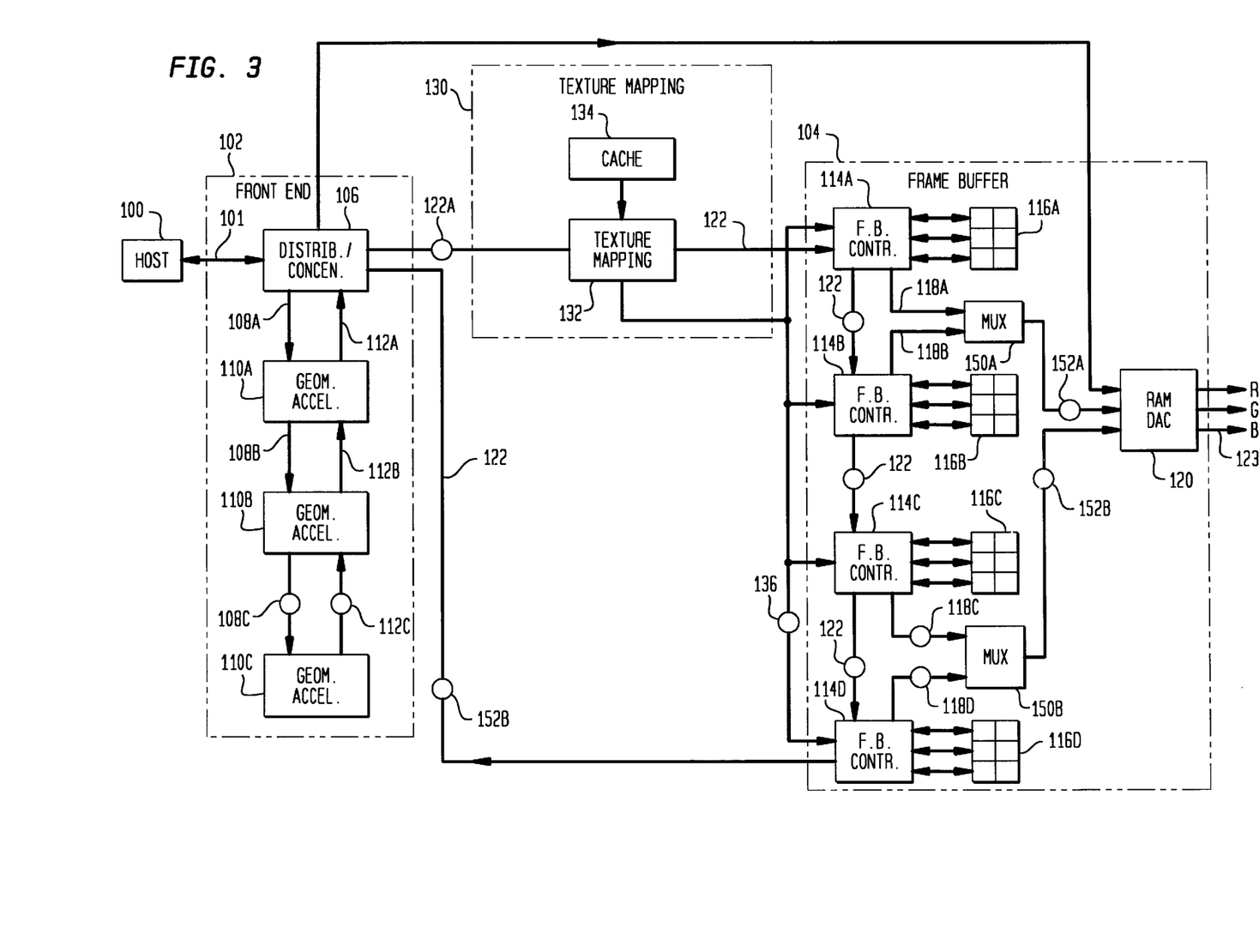
FIG. 3 is a block diagram of a third embodiment of the computer graphics system incorporating the present invention.

FIGS. 1–3 are block diagrams showing different exemplary embodiments of computer graphics systems that employ fog blending on a per pixel basis according to the present invention. Each system has a different number of components and, therefore, offers a different level of performance; two of the systems shown also offer an additional texture mapping feature. It should be understood that the systems shown are exemplary and in no way limiting and that any computer graphics system could utilize the fog blending on a per pixel basis of the present invention.

FIG. 1 shows a block diagram of a simplest computer graphics system of the three. As shown, the system includes a host computer 100, a front end subsystem 102 and a frame buffer subsystem 104. The front end subsystem 102 receives primitives to be rendered from the host computer 100 over bus 101. The primitives typically are specified by X, Y, Z coordinate data, R, G, B color data, alpha blending data, normals, texture coordinates S, T and the like for certain portions of the primitives, such as vertices of a triangle primitive.

Data representing the primitives in three-dimensions is provided by the front end subsystem 102 to the frame buffer subsystem 104 over bus 122. The frame buffer subsystem interpolates the primitive data received from the front end subsystem to compute the pixels on the display screen that will represent each primitive, and to determine resulting object R, G, B color values for each pixel. The R, G, B color control signals for each pixel respectively are provided over R, G, B lines 123 to control the pixels of the display screen (not shown) to display a resulting image thereon.

In the embodiment shown in FIG. 1, the front end subsystem 102 includes a distributor/concentrator 106 and a three-dimensional (3-D) geometry accelerator 110. As noted, the distributor/concentrator 106 receives the X, Y, Z coordinates and color primitive data along bus 101 from host computer 100. Such data is provided from distributor/concentrator 106 to geometry accelerator 110 along bus 108. Geometry accelerator 110 performs conventional geometry accelerator functions resulting in rendering data for display. Such functions may include three-dimensional transformation, lighting, clipping, and perspective divide operations, as well as plane equation generating done in floating point format. The rendering data is provided by geometry accelerator 110 along bus 112 to distributor/concentrator 106 which re-formats the rendering data, performs a floating point to fixed point conversion, and provides such data along bus system 122 to frame buffer subsystem 104.

In this embodiment, the frame buffer subsystem 104 includes two frame buffer controllers 11 4A and 114B, each having a respective SGRAM memory 116A and 116B, as well as a random access memory digital-to-analog converter (RAMDAC) 120. Connected to the bus architecture 122 of the present invention are both the frame buffer controllers 114A and 114B and the distributor/concentrator 106. In this embodiment, bus 122 includes three buses 122A, 122B and 122C, each identical to the other. The bus architecture 122 and associated data transfer protocol offer improved bandwidth.

In the embodiment of FIG. 1, each frame buffer controller 114A and 114B receives rendering data from distributor/concentrator 106. Each frame buffer controller may control different, non-overlapping segments of the display screen. The frame buffer controllers may interpolate the rendering data to compute the screen display pixel coordinates that represent the primitive, and the corresponding object R, G, B color values for each pixel coordinate.

The resulting image video data generated by the frame buffer controllers 114A and 114B, including R, G, B values for each pixel, may be stored in the corresponding SGRAM memories 116A and 116B. Video data may be read from the SGRAM memory chips, re-formatted so that it can handled by RAMDAC 120, and provided to the RAMDAC. The RAMDAC 120, in turn, may convert the digital color data to analog R, G, B color control signals for each pixel, which are provided along R, G, B lines 123 to control a screen display (not shown).

The distributor/concentrator 106 also may communicate directly with the RAMDAC 120 through a video bus 124. In addition, the system preferably is a pipelined system such that the frame buffer subsystem 104 may operate on a first primitive while the front end subsystem 102 is operating on a subsequent (in time) primitive.

FIG. 2 is a block diagram showing another embodiment of a graphics system that may employ the fog blending of the present invention. The system shown in FIG. 2 is similar to the system shown in FIG. 1, except that: (1) two 3-D geometry accelerators 110A and 110B are included in the front end subsystem 102, (2) a texture mapping subsystem 130 is employed, and (3) each SGRAM memory 116A and 116B has been increased in capacity. With two geometry accelerators 110A and 110B, the distributor/concentrator 106 dynamically allocates the primitive data among the geometry accelerators.

The texture mapping subsystem 130 may be any subsystem that carries out texture mapping operations and, in this exemplary embodiment, includes a texture mapping chip 132 and associated local cache memory 134 which stores a limited amount of texture data.

In this embodiment, the bus 122 includes portions 122A–122D. The texture mapping chip 132 is connected to the bus 122 between the distributor/concentrator 106 and the frame buffer controller 114A. During operation, the texture mapping chip 132, like both the frame buffer controller chips 114A and 114B, receives primitive data on bus 122A. The texture mapping chip performs texture mapping of point, vector and triangle primitives. The data representing the primitives may include X, Y, Z object pixel coordinates, object R, G, B color values, S, T texture map coordinates and the plane equations for the primitive. The texture mapping chip 132 may interpolate the x, y pixel coordinates and the S, T texture coordinates to compute resultant texture data for each pixel. The texture data used to compute the resultant texture data for each pixel may, at any one time, be stored in the cache memory 134. If so, then the texture data is read from the cache memory 134. If the texture data needed is not at that time present in cache memory 134, then the texture data is downloaded from the host computer in an efficient manner.

The resultant texture data for each pixel may be provided along texel bus 136 to each frame buffer controller 114A and 114B where it is combined, on a pixel-by-pixel basis, with the object R, G, B color values by each frame buffer controller. In particular, the frame buffer controllers 114A and 114B combine, on a pixel by pixel basis, the object color values R, G, B for each pixel coordinate and the resultant texture data to generate textured R, G, B color values for each pixel to be displayed on the display screen. In addition, numerous blending modes exist, that are user definable, that define the manner in which the object and texture color values are combined.

It should be understood that the front end subsystem 102, the frame buffer subsystem 104 and texture mapping subsystem 130 may be any presently known subsystems or later-developed subsystems. Additionally, each of such subsystems preferably is pipelined and operates on multiple primitives simultaneously. As such, while the texture mapping subsystem 130 and the frame buffer subsystem 104 operate on primitives previously provided by front end subsystem 102, the front end subsystem 102 continues to operate on new primitives until the pipelines in the downstream subsystems become full.

FIG. 3 is a block diagram showing a further embodiment of a graphics system that may employ the fog blending of the present invention. In the system of FIG. 3, the front end subsystem 102 includes three 3-D geometry accelerators 110A, 110B and 110C and the frame buffer subsystem 104 includes four frame buffer controllers 114A–114D, each with an associated SGRAM memory 116A–116D, respectively. The hardware is replicated so that the primitive rendering tasks performed by the hardware can be performed on multiple primitives in parallel or a single primitive can be operated on by the hardware in parallel, thus the replicated hardware and the pipelined system operate to increase the bandwidth of the system. Otherwise, the operation of the system of FIG. 3 is similar to that described with reference to FIG. 2.

Fog blending in accordance with the present invention is described with reference to FIG. 4. As indicated above, the graphics system decomposes objects to be displayed into triangles, vectors and points, and fog blending is applied to the point, vector and triangle primitives. The graphics system includes a rendering parameter calculation unit 160 disposed in the geometry accelerator, chips 110, 110A, 110B and 110C (FIGS. 1–3), that receives the primitive data from the host computer 100. The primitive data may include, inter alia, X, Y and Z coordinates on line 111, for example for a vertex of the primitive being rendered, normal coordinates (NX, NY, NZ) which indicate a unit vector perpendicular to the vertex of the primitive, color values (R, G, B, and α) and texture mapping coordinates S and T. The α color value represents an opacity of the object when background blending is used and enabled; in particular, the a value determines how much of the existing background is used and how much of the primitive color is used. The rendering parameter calculation unit also receives fog blending parameters on line 113.

In general, the rendering parameter calculation unit 160 calculates all rendering parameters in floating point format. The Float to Fix converter 165 converts these rendering parameters to fixed point form, required by the rasterizers in frame buffer controllers 114A, 114B, 114C, 114D (See FIGS. 1–3) for rendering the primitives. For example, the rendering parameters may include, inter alia, the starting color values R, G, B and "cooked exponent value" (CE) information that is eventually used to calculate an exponential fog blending factor (f_exp) and an exponential-squared fog blending factor (f_exp$^2$). As will be discussed in greater detail below, a fog blending factor (f) can be of three different types: linear fog (f_linear), exponential fog f_exp and exponential-squared fog f_exp$^2$.

The fog blending factor f can be implemented with one of two methods: Method (1) wherein the fog blending factor f is calculated by the geometry accelerator for each vertex of a triangle primitive or for at least one pixel of a point or vector primitive, wherein the fog blending factor f is interpolated by the frame buffer controller across the pixels of the primitive, and wherein the interpolated fog blending factor f is applied, per pixel, by the frame buffer controller to each pixel color; and Method (2) wherein a value of Z, an eye coordinate distance between a viewpoint and the 4 fragment to be displayed is calculated by the geometry accelerator for each vertex of a triangle primitive or for at least one pixel of a point or vector primitive, the fog blending factor f is calculated by the frame buffer controller for each pixel of the primitive based on the an interpolated Z value for that pixel, and the fog blending factor f is applied by the frame buffer controller to each pixel color. The graphics system of the present invention uses Method (1) to calculate the linear fog blending factor f_linear and, as will be explained in further detail below, uses Method (2) to calculate the exponential fog blending factor f_exp and the exponential squared fog blending factor f_exp$^2$. Thus, the fog blending rendering parameters provided by the rendering parameter calculation unit include, inter alia, f_linear and the cooked exponent value for at least one pixel in the primitive which, as will be discussed in detail below, are ultimately used to compute the values of exponential fog f_exp and exponential-squared fog f_exp$^2$ for each pixel in the primitive.

The graphics system also includes a float to fix converter 163 that is disposed in the distributor/concentrator 106 (See FIGS. 1–3). The float to fix converter receives the rendering parameters from the rendering parameter calculation unit along bus 112, 112A–112C (See FIGS. 1–3) and converts the rendering parameters from floating point format to fixed point format. The float to fix converter then outputs the rendering parameters in fixed point format on line 122 to a "rasterizer" 165. The rasterizer represents circuitry in the frame buffer controller chips 114A–114D (See FIGS. 1–3).

The rasterizer 165 receives the rendering parameters, in fixed point format, from the floating to fixed point converter 163 on line 122 and ultimately interpolates each of the rendering parameters to compute the screen display pixel coordinates X, Y, Z that represent each pixel in the primitive and the corresponding fogged color values R, G, B for each pixel in the primitive. The rendering parameters provided by the float to fix converter are processed in parallel by a plurality of interpolators (not illustrated) disposed in parallel. Each interpolator operates on and interpolates one of the fixed point rendering parameters including, inter alia, the R, G, B, color values and the cooked exponent value to provide interpolated values of each of the R, G, B color values and the cooked exponent value for each pixel of the primitive being rendered. Each of the interpolators contain identical circuitry and operate independently and simultaneously on the respective rendering parameters for a high throughput. In particular, each interpolator includes an edge stepper 190 and a span stepper 192 as illustrated in FIG. 4.

Figure 7:
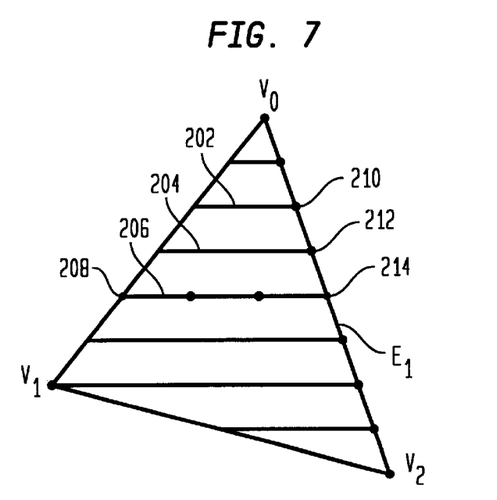
FIG. 7 is an illustration of a triangle primitive rendering process.

Referring to FIG. 7, there is illustrated an example of a triangle primitive to be interpolated. However, it is to be appreciated that although a triangle primitive is illustrated, interpolation and ultimately fog blending, according to the present invention, is also done for vector and point primitives. Each of the above parameters is interpolated by a respective interpolator for each pixel in the triangle primitive. The triangle primitive has vertices $V_0$, $V_1$ and $V_2$ as shown in FIG. 7. The edge stepper 190 computes, inter alia, the R, G, B color values and the cooked exponent values along the edges of the triangle primitive. For example, the edge stepper may step along edge $E_1$ of the triangle from vertex $V_0$ to vertex $V_2$ and determine the starting values of the R, G, B color values and the cooked exponent values for each row 202, 204, 206, and the like as shown in FIG. 7. In particular, the edge pixel values of these parameters, determined by each interpolator, are respectively determined for pixel rows 202–206, at pixels 210, 212 and 214. Thus the edge pixel values for each pixel row are determined by the edge stepper from the value of the parameters at vertex $V_0$ and the slope of the parameter along edge $E_1$.

A length of each pixel row in a primitive is knows as its span. Thus, referring to the triangle primitive of FIG. 7, pixel row 206 has a span of four pixels from pixel 214 to pixel 208. After the edge pixel values for each pixel row have been determined by the edge stepper, the span stepper 192 steps along each pixel row in the X direction and determines the inside pixel parameter values at each pixel in the row, using the edge pixel values for the pixel row and the slope of the parameter value as a function of X. Spans have a constant y value and can be stepped in either the positive or the negative X direction. The output on line 167 of the span stepper 200 is thus a set of, inter alia, R, G, B and cooked exponent values for each pixel in the primitive being rendered. The parameters values for each pixel in the primitive are provided to a texture blend & post texture specular addition unit 164 (see FIG. 4).

The texture blend & post texture specular addition unit 164 receives the parameter values on line 167 for each pixel in the primitive and also receives texels from the texture mapping circuit 130 (FIGS. 2–3) over the bus 136. The texels are texture color values $R_1$, $G_1$, $B_1$, and $α_1$ for each pixel. The texels rendered by the texture mapping circuit and the per pixel colors provided by the rasterizer 165 are synchronized in the texture blend & post texture specular addition unit 164. In addition, the per pixel color values from the rasterizer and the texels from the texture mapping circuit are combined in accordance with a user-selected blending algorithm to provide resulting post texture and specular color values. The resulting post texture and specular color values are supplied via line 169 to a fog unit 166. The linear fog scale factor f_linear and the cooked exponent values for each pixel of the primitive being rendered are also supplied to the fog unit 166 from the rasterizer 165 via line 169, and pass through the texture blend & post texture specular addition unit 164 but are not used, in order to ensure that the pipelined data remains synchronized. The fog unit combines the fog blending factor f and the fog color, received on line 171, with the resulting color values for each pixel to provide fogged colors for each pixel of the primitive.

The fog blending factors f_exp and f_exp$^2$ are not calculated in the geometry accelerator 110, 110A–110C (See FIGS. 1–3) because the interior pixel values of the primitives are not known to the geometry accelerator. Therefore, the fog blending is done downstream in the rasterizer 165. Thus, the rasterizer handles all pixel level fog blending factor calculations and relies on the geometry accelerator to provide the correct rendering parameters.

The operations performed by the fog unit 166 shown in FIG. 4 will now be described in more detail. As indicated above, the rendering parameter calculation unit 160 determines a cooked exponent value for each vertex of a triangle primitive or for at least one pixel of the vector or point primitive being rendered. The cooked exponent value depends on the Z value of, for example, the vertex of the triangle primitive being rendered. The Z value used in calculating the fog blending factor f is defined as the planar distance between the eye (viewpoint) and the vertex or fragment in eye coordinates. The eye coordinates are defined as being negative when Z is in front of the eye and positive when Z is behind the eye (is a right-handed coordinate system). Thus, the cooked exponent value can be either positive or negative depending on whether Z is positive or negative. As will be explained in greater detail below, an absolute value of the cooked exponent is taken when Z is negative.

The rendering parameter calculation unit 160 also calculates the setup information including, inter alia, slopes dCE/dX and dCE/dE$_1$ in accordance with the following equations:

$$dCE/dX = \frac{\Delta Y_2 \Delta CE_1 - \Delta Y_1 \Delta CE_2}{\Delta X_1 \Delta Y_2 - \Delta X_2 \Delta Y_1}$$

$$dCE/dE_1 = (dCE/dX * int(E_1 Slope)) + dCE/dY$$

where
$\Delta_2 = V0 - V2$
$\Delta_1 = V1 - V0$ $$E_1 \text{ Slope} = \frac{X_2 - X_0}{Y_2 - Y_0}$$

$$dCE/dY = \frac{\Delta X_1 \Delta CE_2 - \Delta X_2 \Delta CE_1}{\Delta X_1 \Delta Y_2 - \Delta X_2 \Delta Y_1}$$

where: $X_i$ and $Y_i$, I=0, 1, 2 are the coordinates of vertex I; $CE_i$, I=0, 1, 2 is the cooked exponent value of vertex I, and int ( ) is an integer value.

These values of the cooked exponent value CE, and the cooked exponent value slopes dCE/dX and dCE/dE, are used by the rasterizer 165 to determine the per pixel cooked exponent value CE for each pixel of the primitive being rendered.

In particular, the graphics system implements exponential fog f_exp and exponential-squared fog f_exp$^2$ using Method (2) described above, wherein the rasterizer calculates the blending factor f_exp or f_exp$^2$ per pixel based on the eye coordinant Z, the cooked exponent values CE at each vertex of a triangle primitive or at least one pixel of a vector or point primitive, and the cooked exponent value slopes dCE/dX and dCE/dE provided by the rendering parameter calculation unit 160 and the floating point to fix point converter 163. The blending factors f_exp and f_exp$^2$ computed in the rasterizer 165 are defined by the following equations:

$$f\_exp = e^{-(density \cdot Z)} \quad \quad 1(a)$$

$$f\_exp^2 = e^{-(density \cdot Z)^2} \quad \quad 1(b)$$

A problem with calculating f_exp and f_exp$^2$ is that each of the blending factors contains the exponential function (e). However, one aspect of the present invention is a mathematical implementation to simplify the calculation of each of f_exp and f_exp$^2$. In particular, each of f_exp and f_exp$^2$ can be described by the following equations 2(a) and 2(b):

$$e^{-A} = 2^{(log2(e^{-A}))} = 2^{(-A \, log2(e))} = 2^{-(log2(e) \cdot A)} \quad \quad 2(a)$$

$$e^{-A^2} = 2^{(log2(e^{-A^2}))} = 2^{(-A^2 log2(e))} = 2^{-(log2(e) \cdot A^2)} \quad \quad 2(b)$$

Note that in equations 2(a), 2(b), the term log2 (e) is a constant, thus equations 2(a), 2(b) can be rewritten resulting in following equations 3(a), 3(b):

$$e^{-A} = 2^{-(log2(e) \cdot A)} = 2^{-(1.442695 \cdot A)} = 2^{-integer} * 2^{-fraction} \quad \quad 3(a)$$

$$e^{-A^2} = 2^{-(log2(e) \cdot A^2)} = 2^{-(1.442695 \cdot A^2)} = 2^{-integer} * 2^{-fraction} \quad \quad 3(b)$$

Therefore, using equations 3(a), 3(b) to rewrite equations 1(a) and 1(b) results in f_exp being defined by equation 4(a) and f_exp$^2$ being defined by equation 4(b) as follows:

$$f\_exp = 2^{-(log2(e) \cdot density \cdot z)} = 2^{-integer} * 2^{-fraction} \quad \quad 4(a)$$

$$f\_exp^2 = 2^{-(log2(e) \cdot [(density \cdot z)^2])} = 2^{-integer} * 2^{-fraction} \quad \quad 4(b)$$

The rendering parameter calculation unit 160 computes the values of (log2(e)*density*z) for f_exp and (sqrt[log2 (e)]*(density*z)) for f_exp$^2$ for each vertex of a triangle primitive being rendered or for at least one pixel of a vector or point primitive being rendered. These values, for the purpose of this specification, have been and will hereinafter be referred to as the cooked exponent values CE that are provided to the rasterizer 165. The rasterizer interpolates these cooked exponent values for each pixel of the primitive being rendered and ultimately determines the blending factors f_exp and f_exp$^2$ for each pixel of the primitive being rendered. An advantage of using equations 4(a) and 4(b) for the calculation of f_exp and f_exp$^2$ is in the elimination of the natural exponent (e) as the base (it is now replaced with base 2), while retaining the linear nature in Z, which allows the edge stepper 190 and the span stepper 192 to interpolate each of the cooked exponent values for each pixel of the primitive being rendered and ultimately allows per pixel exponential fog and exponential-squared fog blending.

The rendering parameter calculation unit 160 receives the following parameters from the host computer in connection with computing the cooked exponent values.

start [−∞:+∞];
end [−∞:+∞]; and
density [−∞:∞].

The geometry accelerator has an out-of-range test, wherein if an absolute value of the eye coordinant Z is less than start, the fog blending factors f_exp and f_exp$^2$ are set to "1"; wherein if the absolute value of the eye coordinant Z is greater than a value of end, the fog blending factors f_exp and f_exp$^2$ are set to "0"; and otherwise the f_exp and the f_exp$^2$ are calculated as will be described in detail infra.

For the out-of-range test, a value of start is set to zero and a value of end is the maximum exponential fog distance. The maximum exponential distance end is determined by software from equation (5) wherein an exponential threshold EXP_THRESH is assumed such that:

$$f = e^{-EXP\_THRESH} = 0 \quad (5)$$

and the maximum exponential fog distance end is defined according to equations 6(a), 6(b) for f_exp and for f_exp$^2$:

$$end = EXP\_THRESH/density \quad 6(a)$$

$$end = sqrt(EXP\_THRESH/density) \quad 6(b)$$

In an embodiment of the present invention the computer graphic system's color is defined by eight bits, so a value of the fog blending factors f_exp and f_exp$^2$ less than $2^{-8}$ no longer influences the overall color and is effectively "0". Therefore EXP_THRESH is limited by equation (7):

$$e^{-EXP\_THRESH} < 2^{-8} \Rightarrow EXP\_THRESH > -\ln(2^{-8})(=5.545) \quad (7)$$

The graphic system of the present invention also allows for a conformance error of:

$$1.5*(lsb\ of\ color + zero\_epsilon) = 1.5*(2^{-8} + 2^{-13}) = 0.00606 \quad (8)$$

where zero_epsilon is an allowance for floating-point math errors. Referring to equation (9), the EXP_THRESH limit can be redefined to be:

$$EXP\_THRESH > -\ln(0.00606)(=5.106) \quad (9)$$

The rendering parameters are provided from the geometry accelerator to the rasterizer in 10.22 data format including a sign bit, an overflow bit, eight bits corresponding to the parameter and twenty-two precision bits. Accordingly, for this embodiment of the present invention, a value of 177.0 is selected for EXP_THRESH because 177* log2(e) is the largest integer that fits into the 10.22 data format.

In order to remove some of the hardware complexity needed for the geometry accelerator, the rasterizer may receive initial values of fog_density, fog_start, fog_end, and maxscale from software shown in Table 1:

TABLE 1

| Register | f_exp | f_exp$^2$ |
|---|---|---|
| fog_density | log2(e)*density | sqrt[log2(e)]*density |
| fog_start | "0" | "0" |
| fog_end | if !(density = 0), EXP_THRESH/density if (density = 0), don't care | if !(density = 0), sqrt(EXP_THRESH)/density if (density = 0), don't care |
| maxscale | log2(e)*EXP_THRESH | sqrt[log2(e)*EXP_THRESH] |

For the values of f_exp and f_exp$^2$, the value of density is predefined by the user. In addition, the software ensures that the density is always a positive number.

The rendering parameters provided by the rendering parameter calculation unit 160 to the rasterizer 165 for f_exp and f_exp$^2$ include, inter alia, the cooked exponent values CE (log2(e)*density*z) for f_exp, (sqrt [log2(e)]* (density*z))for f_exp$^2$ and the R, G, B color values for certain pixels in the primitive such as, for example, the vertices of the triangle primitive illustrated in FIG. 7. For the exponential fog blending factor f_exp and for the exponential-squared fog blending factor f_exp$^2$, the rasterizer 165 interpolates the cooked exponent values CE, and the R, G, B color values for each pixel of the primitive being rendered with the hardware 190, 192 illustrated in FIG. 4. The rasterizer calculates the blending factors f_exp and f_exp$^2$ for each pixel, from the cooked exponent values, with the fog unit 166 and calculates the new pixel color on a per-pixel basis with the fog unit 166 according to Method (2) described above. Thus, for exponential fog f_exp and exponential-squared fog f_exp$^2$, the rasterizer interpolates the cooked exponent values for each pixel of the primitive being rendered based on the incoming cooked exponent values and the derivates of the cooked exponent values with respect to E and X, determines the respective fog blending factor for each pixel from the cooked exponent value for that pixel, and blends the fogged color with the R, G, B color for each pixel in the primitive according to the respective fog blending factor.

Figure 4:
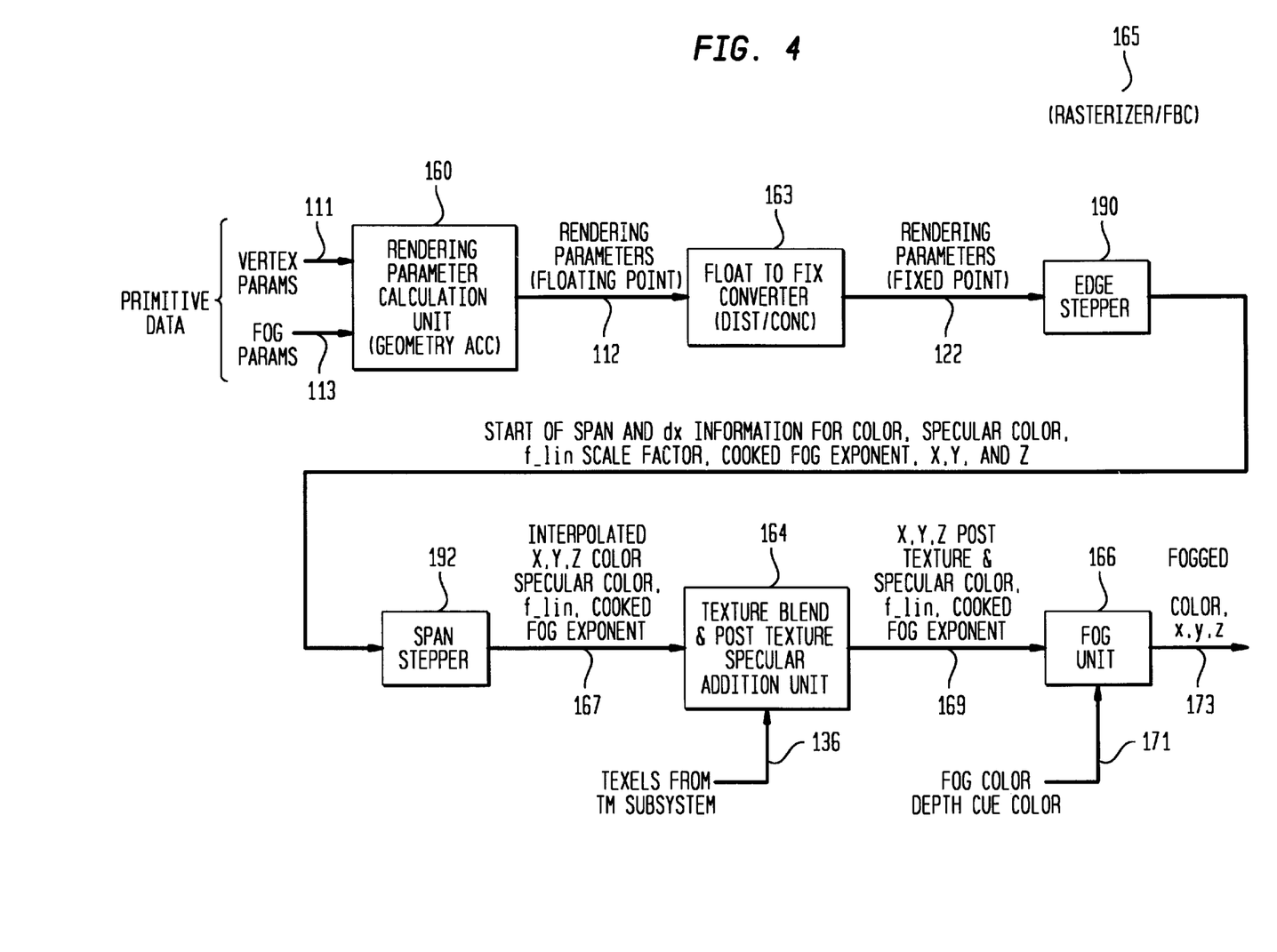
FIG. 4 is a block diagram of the geometry accelerator, the distributor/concentrator and the frame buffer controller of the graphics system of FIGS. 1–3, incorporating fog blending in accordance with the present invention.
Figure 5:
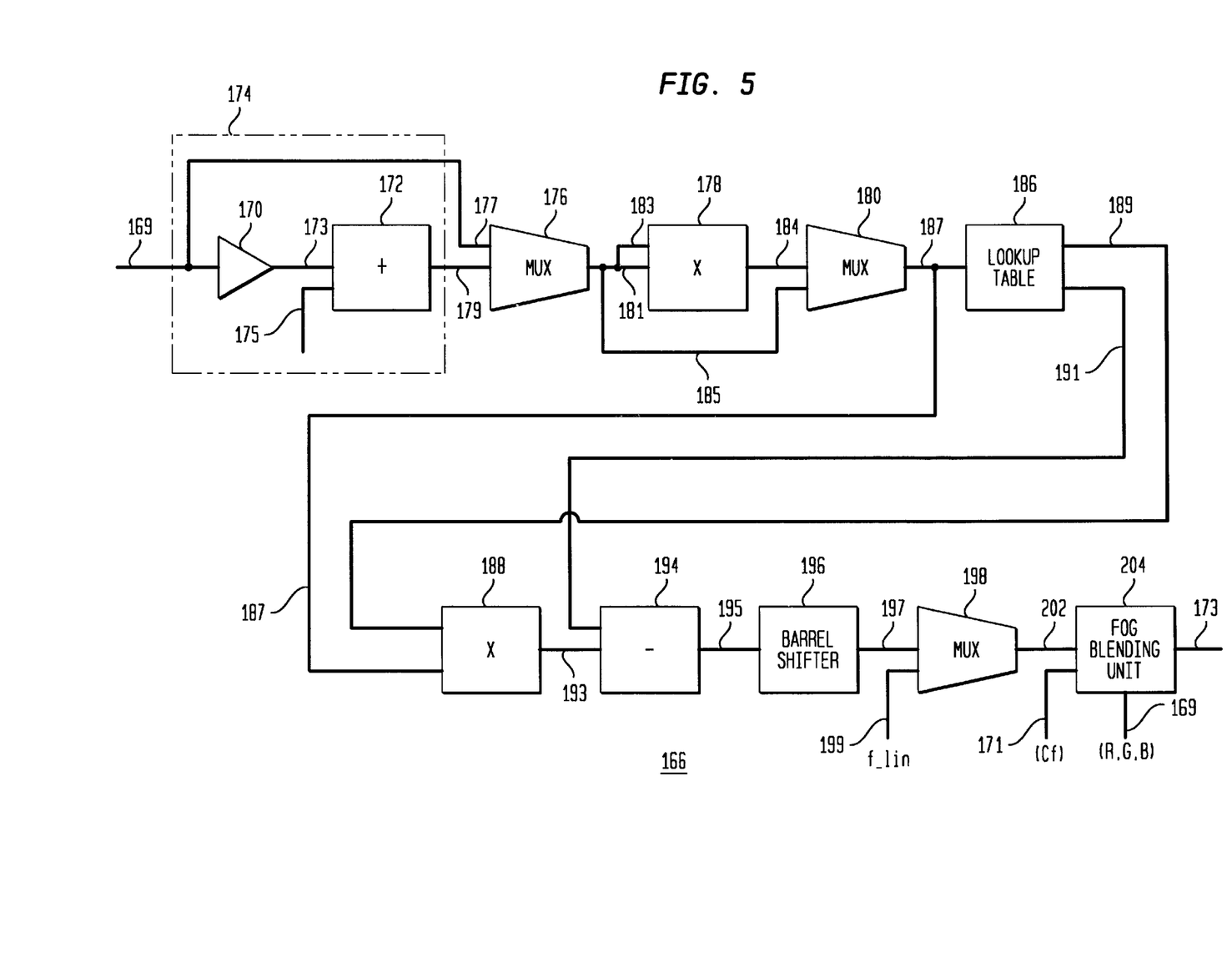
FIG. 5 is block diagram of the fog unit illustrated in FIG. 4.

FIG. 5 is a block diagram of the fog unit 166 illustrated in FIG. 4. The fog unit 166 receives on line 169 the interpolated cooked exponent values CE for f_exp and f_exp$^2$ in 10.22 data format. As discussed above, the value of Z in eye coordinants can be negative when Z is in front of the eye thus causing the cooked exponent values to be negative. Thus an absolute value circuit 174 may be used to take an absolute value of the cooked exponent values when Z is negative. The absolute value circuit 174 includes an inverter 170 which inverts the cooked exponent value on line 169 and outputs the inverted cooked exponent value on line 173 and an adder 172 which receives the inverted cooked exponent value and adds a value "1" from line 175 to the inverted cooked exponent value. Inverting the value of the cooked exponent value and adding 1 provides the 2's complement absolute value of the cooked exponent value at an output on line 179.

A multiplexer 176 selects between the absolute value of the cooked exponent value on line 179 and the incoming cooked exponent value on the line 177, and outputs the selected value at an output on line 181. As discussed above, the cooked exponent values for exponential-squared fog is the (sqrt[log2(e)]*(density*z)) which is used so that the cooked exponent value is linear in Z and which allows interpolation of the cooked exponent value for the primitive being rendered. However, the cooked exponent value must be squared to get back to the exponential-squared fog blending factor f_exp$^2$ defined in equation 4(b). Thus, after the cooked exponent value has been interpolated for each pixel of the primitive as discussed above, when exponential-squared fog blending is enabled, the selected value at the output of the multiplexer on line 181 is squared by multiplying the selected value with itself on line 183, via multiplier 178, and providing the squared value at an output of the multiplier on line 184.

A multiplexer 180 selects between the squared value of the cooked exponent value on line 184 which is used to derive the exponential-squared fog blending factor f_exp$^2$ and the cooked exponent value on line 185, which is to be used to calculate the exponential fog blending factor f_exp. A selected value is provided by the multiplexer 180 at an output on line 187. As was discussed above with respect to equations 4(a) and 4(b), the exponential fog blending factor f_exp and the exponential-squared fog blending factor f_exp$^2$ are made up of a $2^{-integer}$ and a $2^{-fraction}$ portion. A lookup table 186, a multiplier 188 and a subtractor 194 are used to calculate the $2^{-fraction}$ portion of the fog blending factor.

In particular, in one embodiment of the present invention the lookup table 186 has eight rows that correspond to all possible combinations of three digits after the binary point of the cooked exponent value. In other words, row 0 corresponds to a value of 0.000, row 1 corresponds to a value of 0.001, . . . through row 7 which corresponds to a value of 0.111. The lookup table also has two columns for each row: a first column having a first entry corresponding to a first part of the $2^{-fraction}$ portion of the fog blending factor and a second column corresponding to a delta between the entry for the first part of the $2^{-fraction}$ portion for the current row and to the entry for the first part of the $2^{-fraction}$ portion for the next row in the lookup table. In other words, the first column of the lookup table contains eight entries that represent a first part of the $2^{-fraction}$ portion of the fog blending factor, where row 0 contains an entry corresponding to a cooked exponent value of $2^{000}$, row 1 contains an entry corresponding to a cooked exponent value of $2^{-001}$, and row seven contains an entry corresponding to a cooked exponent value of $2^{-111}$. The second column of the lookup table contains eight entries that are the difference between the entry addressed by the 3 bits to the right of the binary point of the cooked exponent value and the next entry. For example, one entry of the second column will be the difference between the first part of the $2^{-fraction}$ portion of the fog blending factor corresponding to the cooked exponent values having the values $2^{-010}$ and $2^{-011}$. Thus, the lookup table provides two output values for each possible three digit entry to the right of the binary point of the cooked exponent value: the delta between the entries in the lookup table on line 189 and the entry corresponding to first part of the $2^{-fraction}$ portion of the fog blending factor on line 191.

The multiplier 188 in combination with the subtractor 194 together use the delta value on line 189 and the entry corresponding to the first part of the $2^{-fraction}$ portion of fog blending factor on line 191 to compute the $2^{-fraction}$ portion of the fog blending factor. In particular, since the fractional bits of the cooked exponent value are truncated to three bits for the lookup table, additional fractional bits to the right of the binary point of the cooked exponent value following the first 3 bits represent how close to the next 3 bit entry the cooked exponent value actually is. Therefore, by multiplying these additional bits by the difference value out of the table, a linearly interpolated approximation to a remainder of the $2^{-fraction}$ portion of the fog blending factor is realized (i.e. a linear approximation of the value between the lookup table entries), without the use of a lot of hardware. This is realizable because the $2^{-fraction}$ portion of the fog blending factor is approximately linear for small increments in the cooked exponent value.

Referring to FIG. 5, the multiplier 188 receives the entry corresponding to the delta between the entries in the lookup table on line 189 and receives the additional bits of the cooked exponent value on line 187. The multiplier multiplies the additional bits by the delta entry to provide at an output on line 193 the linearly interpolated approximation to the remainder of the $2^{-fraction}$ portion of the fog blending factor. The subtractor 194 then subtracts the linear interpolation of the remainder of the $2^{-fraction}$ portion of the fog blending factor, received on line 193, from the first part of the $2^{-fraction}$ portion of the fog blending factor, received on line 191, and provides at an output on line 195 the $2^{-fraction}$ portion of the fog blending factor.

Multiplication of the $2^{-fraction}$ portion of the fog blending factor by the $2^{-fraction}$ portion of the fog blending factor to arrive at the fog blending factor f_exp or f_exp$^2$ can be done with a barrel shifter 196. For example, the multiplication of the $2^{-fraction}$ portion of the fog blending factor by $2^{-1}$ can be achieved by shifting to the right the $2^{-fraction}$ portion on line 195 by 1 digit, or in other words by multiplying the $2^{-fraction}$ portion by one half. Thus, the barrel shifter 196 provides at an output on line 197 the calculated value of f_exp or f_exp$^2$.

A multiplexer 198 then selects between the value of f_exp or f_exp$^2$ and a value of f_linear on line 199. The multiplexer then provides at an output on line 202 the fog blending factor f to a fog blending unit 204. The fog blending unit 204 receives the fog blending factor f on line 202, receives the R, G, B pixel colors for the respective pixel on line 169, and a fog color value (Cf) from software on line 171 and blends the fog color with the R, G, B colors according to the fog blending factor f for each pixel of the primitive, as will be discussed in detail below. A fogged color or if fog blending is not enabled, the R, G, B color values for each pixel of the primitive are output from the fog blending unit 204 on line 173.

In summary, the $2^{-fraction}$ portion of the f_exp or f_exp$^2$ is computed using the look-up table 186, the multiplier 188 and the subtractor 194 and multiplication of the $2^{-fraction}$ portion by the $2^{-integer}$ portion of the fog blending factor to arrive at the final value for f_exp or f_exp$^2$ is achieved by right shifting the $2^{-fraction}$ portion by the integer value of the $2^{-integer}$ portion. Further, with respect to the exponential-squared fog blending factor f_exp$^2$, the rasterizer further interpolates the cooked exponent value (sqrt[log 2(e)]* (density*z)) by squaring the cooked exponent value and otherwise computes f_exp$^2$ via substantially the same method described above with respect to f_exp. The squaring of the cooked exponent value is thus the only major difference between computing f_exp and f_exp$^2$.

Referring to FIGS. 4–5 the fog blending unit 204 performs fog blending of each R, G, B color value on a per pixel basis and also performs depth cue blending. The fog unit 166 implements the following equation for depth cue coloring:

$$C=DC*Ci+(1-DC)Cd \qquad (10)$$

where C is the final color per pixel provided on line 173, Ci is the incoming R, G, or B pixel color on line 169 after passing through the texture blend & post texture specular addition unit 164 (See FIG. 4), DC is the depth cue scale factor, and Cd is the depth cue color received on line 171 (See FIG. 4). The fog blending unit 204 also implements the following fog blending equation:

$$C=fCi+(1-f)Cf \qquad (11)$$

where C, Ci are the same as above, f is one of the fog blending factors f_linear, f_exp and f_exp$^2$ received on line 202, depending on the desired blending mode, and Cf is the fog color provided on line 171.

Figure 6:
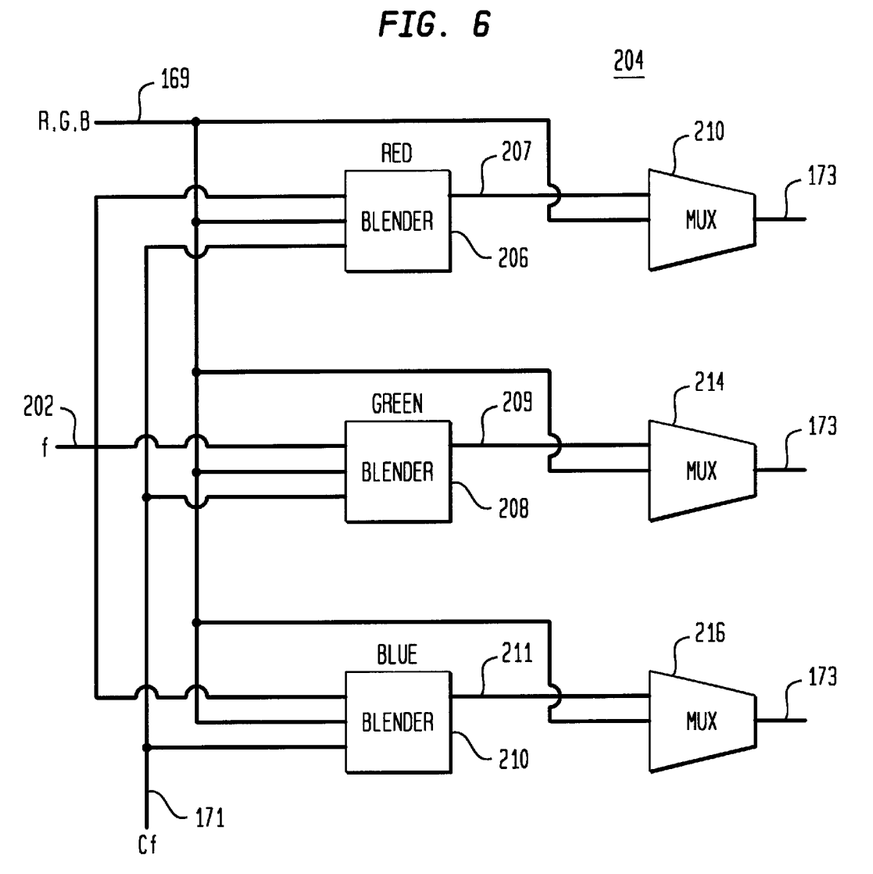
FIG. 6 is a schematic diagram of the fog blending unit illustrated in FIG. 5.

FIG. 6 is a block diagram of a portion of the fog blending unit 204 illustrated in FIG. 5. The fog blending unit includes a red blender 206, a green blender 208 and a blue blender 210. Each of the blenders 206–210 receives the respective R, G, or B color value for the corresponding pixel on line 169, the fog color Cf on line 171 and the fog blending factor on line 202. The blenders then implement the above-described blending equation and provide at an output on lines 207, 209 and 211 the respective red, green and blue fog blended color values. In addition, the fog blending unit 204 includes multiplexers 210, 214 and 216 which receive the red, green and blue fog blended colors on respective lines 207, 209 and 211 and which also receive the original R, G, B color values on line 171. The multiplexers then select between the fog blended color value and the original R, G, or B color value depending on whether fog blending is enabled. The fog blended R, G, B color value or the original R, G, B color value is then provided at an output on line 173.

The incoming R, G, B pixel color provided on line 169 and used by the fog blending unit 204 to implement the above equations is the resulting color value received from the texture blend & post texture specular addition unit 164 (See FIG. 4). The depth cue scale factor DC and f_linear are the per pixel values computed by the combination of the geometry accelerator and the rasterizer according to the method (1) discussed above. The fog blending factors f_exp and f_exp$^2$ are computed by the combination of the geometry accelerator and the rasterizer according to method (2) as discussed above. The depth cue color Cd and the fog color Cf are specified by software and the hardware prevents the values from changing within the rasterization of each primitive. The depth cue coloring and fog coloring are mutually exclusive. Thus, the fog unit 166 (See FIG. 4) provides at an output one of the depth cue colored, fog colored, or the textured and specularly lit color value C for each pixel on line 173.

The above-described approaches to fog blending allow proper application of depth cueing and fog blending to texture mapped polygons, because the depth cueing and the fog blending are performed after the texture map has been applied. Otherwise, if depth cueing and fog blending were performed, for example, prior to texture mapping the depth cue information and the fog information may be distorted or even lost by the texture mapping in the texture blend & post texture specular addition unit 164.

The circuitry described herein is preferably implemented in a large scale custom integrated circuit. However, it is to be appreciated that the circuitry may also be implemented in a field programmable gate array, in software, or in any combination of these.

Having thus described at least one illustrative embodiment of the invention, various alterations, modifications and improvements will readily occur to those skilled in the art. Such alterations, modifications and improvements are intended to be within the spirit and scope of the invention. Accordingly, the foregoing description is by way of example only and is not intended as limiting. The invention is limited only as defined in the following claims and the equivalents thereto.

What is claimed is:

1. In a computer graphics system, an apparatus for fog blending colors, comprising:

a rendering parameter calculation unit configured to determine a cooked exponent value and a color value for at least one vertex of a primitive using primitive data, wherein said cooked exponent value is one of ($\log_2 e$)(fog density)(Z-depth) and (sqrt(log2e))(fog density)(Z-depth);

a rasterizer configured to interpolate said cooked exponent value of said at least one vertex to determine a cooked exponent value for each intermediate pixel in the primitive without using said Z-depth value of said intermediate pixels;

a fog unit, responsive to the cooked exponent value for each pixel of the primitive, configured to determine a fog blending factor that is one of an exponential fog blending factor and an exponential-squared fog blending factor for each pixel of the primitive; and a fog blending unit that blends said fog color value with said color value for each pixel of the primitive according to said fog blending factor for the respective pixel to generate a fogged color value for each pixel of the primitive.

2. The computer graphics system of claim 1, wherein said rasterizer comprises:

a first interpolator that interpolates said pixel color value and said cooked exponent value along an edge of the primitive, generating said pixel color value and said cooked exponent value for each pixel of the edge of the primitive.

3. The computer graphics system of claim 2, wherein said rasterizer further comprises:

a second interpolator that interpolates said pixel color value and said cooked exponent value along one or more spans of the primitive, generating said pixel color value and said cooked exponent value for each pixel of the span of the primitive.

4. The computer graphics system of claim 1, wherein said fog unit comprises:

a lookup table having a first column of entries that correspond to a first part of a $2^{-fraction}$ portion of the fog blending factor, and a second column of entries that correspond to a delta between two consecutive entries in the first column of entries.

5. The computer graphics system of claim 4, wherein said fog unit further comprises:

a multiplier, responsive to said delta value, that multiplies said delta value with the additional bits of said cooked exponent value and that provides an interpolated value of a second part of the $2^{-fraction}$ portion of the fog blending factor at an output of the multiplier; and a subtractor, responsive to said interpolated value of said second part of the $2^{-fraction}$ portion of said fog blending factor and to one of the entries of the first column of entries of said lookup table that subtracts the interpolated value of the second part of the $2^{-fraction}$ portion of said fog blending factor from the first part of the $2^{-fraction}$ portion of said fog blending factor to generate a value of the $2^{-fraction}$ portion of said fog blending factor.

6. The computer graphics system of claim 5, wherein said fog unit further comprises:

a barrel shifter that shifts to the right the value of the $2^{-fraction}$ portion of said fog blending factor by an integer value so as to provide multiplication of the $2^{-fraction}$ portion of said fog blending factor with a $2^{-fraction}$ portion of said fog blending factor to generate said fog blending factor.

7. The computer graphics system of claim 1, wherein said fog unit comprises:

a multiplier, responsive to said cooked exponent value for each pixel of the primitive, that multiplies said cooked exponent value by itself to provide a squared value of said cooked exponent value for each pixel of the primitive, when said fog blending factor to be determined is said exponential-squared fog blending factor.

8. The computer graphics system of claim 1, wherein the computer graphics system further comprises:

means for determining said cooked exponent value, corresponding to the exponential fog blending factor, for each pixel of the primitive in accordance with:

cooked exponent value=($\log_2 e$)(fog density)(Z-depth).

9. The computer graphics system of claim 1, wherein the computer graphics system further comprises:

means for determining said cooked exponent value, corresponding to the exponential-squared fog blending factor, for each pixel of the primitive in accordance with:

cooked exponent value=(sqrt(log$_2$e))(fog density)(Z-depth).

10. The computer graphics system of claim 8, wherein said fog unit comprises:
means for determining said exponential fog blending factor for each pixel of the primitive in accordance with:

exponential fog blending factor $f\_exp = 2^{-(log2e)(fog\ density)(Z-depth)}$.

11. The computer graphics system of claim 9, wherein the fog unit includes a means for determining the exponential-squared fog blending factor for each pixel of the primitive in accordance with:

exponential-squared fog blending factor $f\_exp^2 = 2^{-(sqrt(log2e))(fog\ density)(Z-depth)}$ 12. The computer graphics system of claim 1, wherein the fog blending unit includes a blender that determines the fogged color value for each pixel of the primitive in accordance with:

fogged color value=pixel color×fog blending factor+a fog color× (1−fog blending factor).

13. The computer graphics system of claim 12, wherein said fog blending unit further comprises:
a multiplexer, responsive to said fogged color value for each pixel of the primitive and to said pixel color value for each pixel of the primitive that selects one of said fogged color value and said pixel color value for each pixel of the primitive to generate the selected color value for each pixel of the primitive.

14. In a computer graphics system comprising a geometry accelerator and a rasterizer that together generate a graphics image for display on a video display screen, a method for fog blending colors in the graphics system comprising the steps of:
determining a cooked exponent value and a color value for at least one vertex of a primitive using primitive data, wherein said cooked exponent value is one of (log$_2$e)(fog density)(Z-depth) and (sqrt(log$_2$e))(fog density)(Z-depth);
interpolating said cooked exponent value of said at least one vertex to determine a cooked exponent value for each intermediate pixel in the primitive without using said Z-depth value of said intermediate pixels;
determining a fog blending factor that is one of an exponential fog blending factor and exponential-squared fog blending factor for each pixel of the primitive in response to the cooked exponent value for each pixel of the primitive; and
blending said fog color value with said color value for each pixel of the primitive according to said fog blending factor for the respective pixel to generate a fogged color value for each pixel of the primitive.

15. The method of claim 14, farther comprising the step of:
interpolating said color value and said cooked exponent value along an edge of the primitive to generate said color value and said cooked exponent value for each pixel of the edge of the primitive.

16. The method of claim 15, further comprising the step of:
interpolating said cooked exponent value and said color value along one or more spans of the primitive, in response to the color value and the cooked exponent value for each pixel of the edge of the primitive, to provide said cooked exponent value and said color value for each pixel of the span of the primitive.

17. The method of claim 14, wherein said step of determining said fog blending factor includes the step of:
determining, with a lookup table having a first column of entries that correspond to a first part of a $2^{-fraction}$ portion of said fog blending factor and a second column of entries that correspond to a delta between two consecutive entries in the first column of entries.

18. The method of claim 17, wherein said step of determining said fog blending factor further includes the step of:
linearly interpolating a second part of the $2^{-fraction}$ portion of sad fog blending factor.

19. The method of claim 18, wherein said step of determining said fog blending factor further comprises the step of:
subtracting the second part of the $2^{-fraction}$ portion of said fog blending factor from the first part of the $2^{-fraction}$ portion of said fog blending factor to determine the $2^{-fraction}$ portion of said fog blending factor.

20. The method of claim 19, wherein said step of determining said fog blending factor further comprises the step of:
multiplying the $2^{-fraction}$ portion of said fog blending factor with a $2^{-fraction}$ portion of said fog blending factor by shifting, to the right, the $2^{-fraction}$ portion of said fog blending factor by the integer value.

21. The method of claim 14, wherein said step of determining said fog blending factor further comprises the step of:
squaring said cooked exponent value for each pixel of the primitive when said fog blending factor is the exponential-squared fog blending factor.

22. The method of claim 14, further comprising the step of:
selecting one of said fogged color value and said color vale for each pixel of the primitive and displaying the selected color value for each pixel of the primitive.

* * * * *

UNITED STATES PATENT AND TRADEMARK OFFICE
CERTIFICATE OF CORRECTION

PATENT NO. : 6,437,781 B1
DATED : August 20, 2002
INVENTOR(S) : S. Paul Tucker et al.

It is certified that error appears in the above-identified patent and that said Letters Patent is hereby corrected as shown below:

Column 18,
Line 5, delete "farther" and insert therefore -- further --
Line 30, delete "sad" and insert therefore -- said --
Line 42, delete "$2^{-fraction}$" and insert therefore -- $2^{-integer}$ --
Line 54, delete "vale" and insert therefore -- value --

Signed and Sealed this

Sixth Day of July, 2004

JON W. DUDAS
*Acting Director of the United States Patent and Trademark Office*